(12) United States Patent
Kim

(10) Patent No.: US 8,835,035 B2
(45) Date of Patent: Sep. 16, 2014

(54) BATTERY PACK

(75) Inventor: Tae-Yong Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 546 days.

(21) Appl. No.: 12/795,503

(22) Filed: Jun. 7, 2010

(65) Prior Publication Data

US 2011/0151301 A1    Jun. 23, 2011

(30) Foreign Application Priority Data

Dec. 18, 2009   (KR) .................... 10-2009-0126926

(51) Int. Cl.
| | | |
|---|---|---|
| *H01M 10/50* | (2006.01) | |
| *H01M 10/6569* | (2014.01) | |
| *H01M 10/613* | (2014.01) | |
| *H01M 10/659* | (2014.01) | |
| *H01M 10/655* | (2014.01) | |
| *H01M 10/647* | (2014.01) | |
| *H01M 2/10* | (2006.01) | |
| *H01M 10/625* | (2014.01) | |

(52) U.S. Cl.
CPC ...... *H01M 10/5089* (2013.01); *H01M 10/5079* (2013.01); *H01M 10/5004* (2013.01); *H01M 10/5044* (2013.01); *H01M 10/5032* (2013.01); *H01M 10/5016* (2013.01); *Y02E 60/12* (2013.01); *H01M 2/1077* (2013.01)
USPC .......................................................... 429/120

(58) Field of Classification Search
USPC .......................................................... 429/120
See application file for complete search history.

(56) References Cited

U.S. PATENT DOCUMENTS

2007/0259263 A1*  11/2007  Shibuya et al. ............... 429/186
2010/0255359 A1   10/2010  Hirakawa et al.

FOREIGN PATENT DOCUMENTS

| JP | 2008059950 A | * | 3/2008 |
|---|---|---|---|
| JP | 2009-135088 A | | 6/2009 |
| JP | 2009-266402 A | | 11/2009 |
| KR | 100222551 B1 | | 7/1999 |
| KR | 1020070025417 A | | 3/2007 |

OTHER PUBLICATIONS

KIPO issued Notice of Allowance dated Jul. 29, 2011 issued in Korean Application No. 10-2009-0126926, 5 pages.

* cited by examiner

*Primary Examiner* — Karie O'Neill Apicella
(74) *Attorney, Agent, or Firm* — Christie, Parker & Hale, LLP

(57) ABSTRACT

A battery pack includes a plurality of battery modules each comprising a plurality of battery cells; and a heat absorber mounted adjacent to at least one of the battery modules, wherein the heat absorber includes a phase change material.

10 Claims, 7 Drawing Sheets

BATTERY PACK

CROSS-REFERENCE TO RELATED APPLICATIONS

This application claims priority to and the benefit of Korean Patent Application No. 10-2009-0126926, filed on Dec. 18, 2009, in the Korean Intellectual Property Office, the disclosure of which is incorporated herein in its entirety by reference.

BACKGROUND

1. Field

One or more embodiments of the present invention relate to a battery pack including a plurality of battery modules each formed by stacking a plurality of battery cells.

2. Description of the Related Art

Rechargeable batteries refer to batteries that can be charged or discharged as opposed to primary batteries that cannot be recharged. Rechargeable batteries are widely used in cars and in high tech electronic devices, such as cellular phones, laptop computers, and camcorders.

Rechargeable batteries typically include an electrode assembly and an electrolyte solution. The electrode assembly includes a positive electrode plate, a negative electrode plate, and a separator. The electrolyte solution usually includes lithium ions. The positive electrode plate and the negative electrode plate of the electrode assembly may each include an electrode tab that extends from the electrode assembly.

The electrode assembly may be accommodated inside a case, and electrode terminals may be exposed from the case. The electrode tabs may extend from the electrode assembly and be electrically coupled to the electrode terminals. The case may be cylindrical or polygonal.

A battery module may be formed by stacking a plurality of battery cells horizontally or vertically. Also, a plurality of battery modules may be stacked horizontally or vertically to thereby form a battery pack.

SUMMARY

One or more embodiments of the present invention include a battery pack with improved cooling characteristics by increasing a heat capacity of the battery pack.

According to one or more embodiments of the present invention, a battery pack includes a plurality of battery modules each comprising a plurality of battery cells; and a heat absorber mounted adjacent to at least one of the battery modules. The battery pack may also include a cover. In one embodiment, the heat absorber comprises a phase change material, such as water or ethanol and glycerin. Further, the heat absorber may be removably mounted on the battery module or on the cover.

In one embodiment, each of the battery modules includes a plurality of the battery cells stacked together; a lower frame that supports a lower portion of the battery cells; an upper frame that supports an upper portion of the battery cells; and a side frame that supports a lateral side of the battery cells. Further, the heat absorber may be mounted on at least one of the upper frame and the side frame.

According to the battery pack of the embodiments of the present invention, the cooling characteristics of the battery pack may be improved by increasing a heat capacity of the battery pack.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Figure 1:
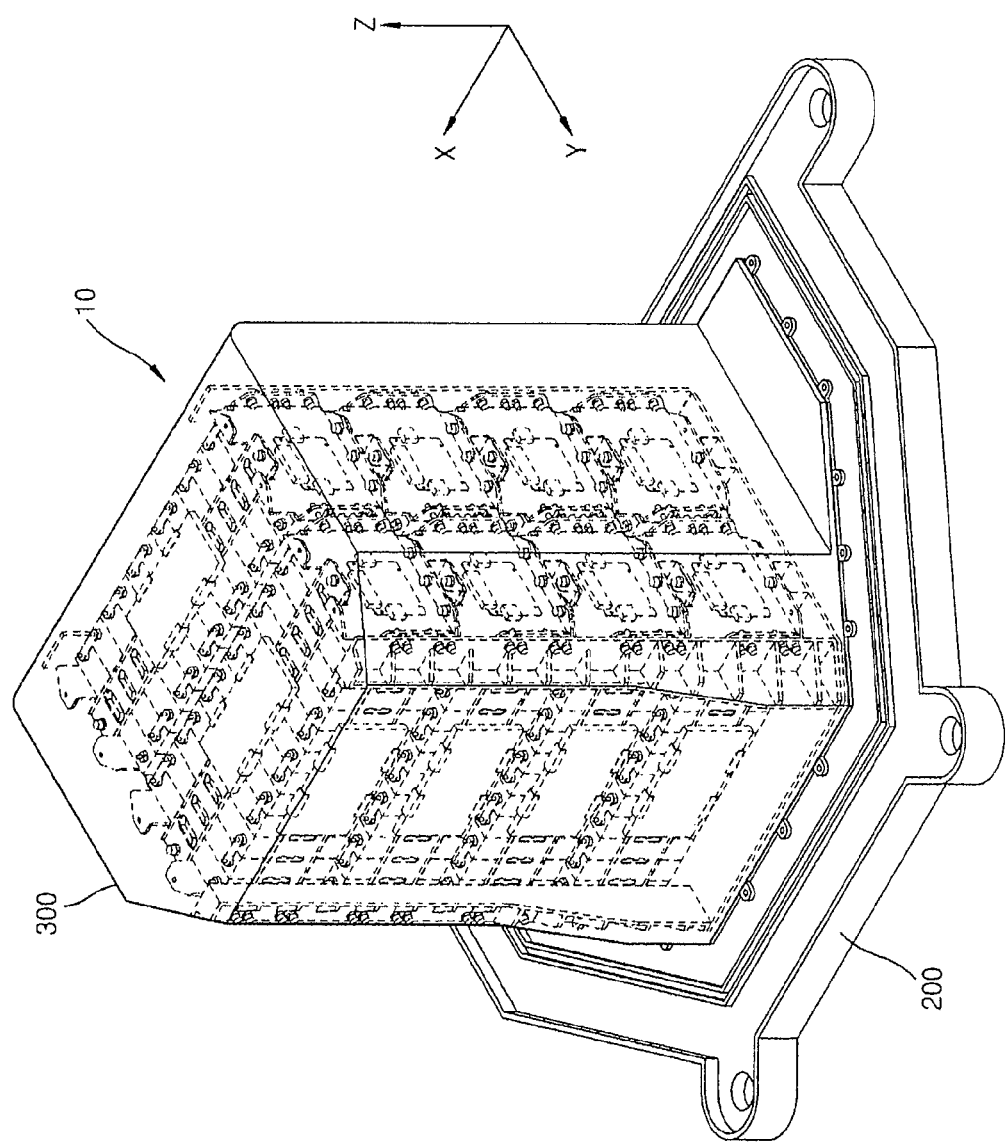
FIG. 1 is a perspective view illustrating an external appearance of a battery pack according to an embodiment of the present invention.
Figure 2:
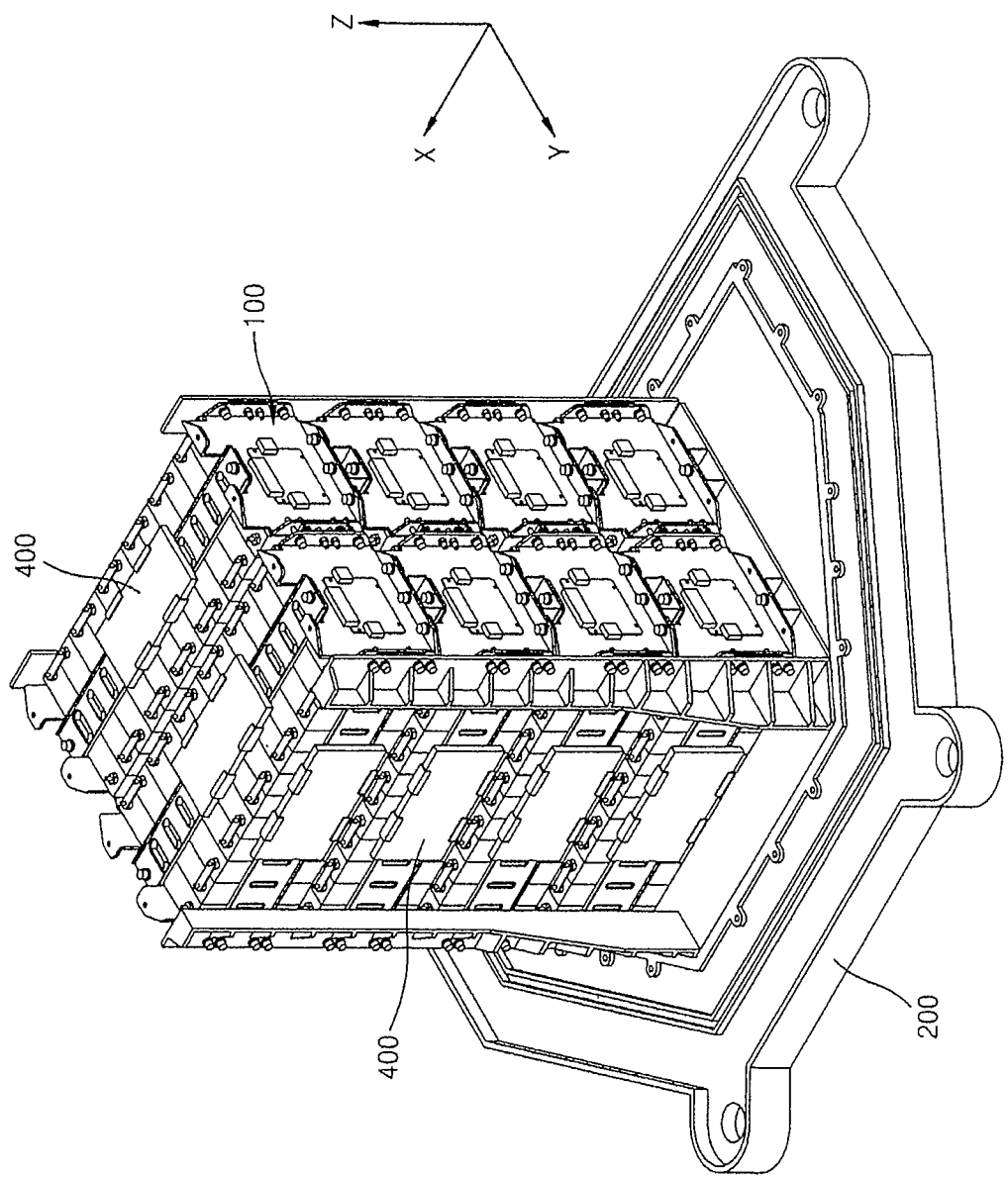
FIG. 2 is a perspective view of the battery pack of FIG. 1 without a cover.

FIG. 1 is a perspective view illustrating an external appearance of a battery pack 10 according to an embodiment of the present invention. FIG. 2 is a perspective view illustrating the battery pack 10 of FIG. 1 without a cover and in which a heat absorber 400 is mounted on a battery module 100.

As shown in FIGS. 1 and 2, the battery pack 10 may be formed by stacking a plurality of battery modules 100 in a vertical direction or in a horizontal direction. Also, the battery modules 100 may each include at least one battery cell 110 (see FIG. 4). Here, a plurality of battery cells 110 are stacked together as a single unit. The battery cells 110 may generate heat when being charged or discharged, and accordingly, performance and lifespan of the battery pack 10 may degrade due to the generated heat.

In particular, since the battery cells 110 are stacked in the battery pack 10, heat may be poorly dissipated from each of the battery cells 110. Accordingly, the battery pack 10 includes the heat absorber 400, which increases a heat capacity of the battery pack 10 so that heat generated inside the battery pack 10 is efficiently dissipated.

In one embodiment, the battery pack 10 may be mounted in an electric car or a hybrid car that performs electric operations. The battery pack 10 may be mounted in a car via a quick drop method so that the battery pack 10 may be removed from the car.

Conventionally, a circulation cooling method may be applied to the battery pack 10, in which a cooling material is supplied and circulated inside the battery pack 10 and then discharged.

Since the quick drop method allows the battery pack 10 to be completely separated or removed from the car, it is difficult to apply the circulation cooling method to the battery pack 10. However, according to the current embodiment of the present invention, the heat absorber 400 is separably or removably mounted on the battery pack 10, and the heat absorber 400 may be separated from the battery pack 10 or exchanged with another heat absorber 400 after absorbing heat from the battery pack 10, thereby efficiently dissipating heat from the battery pack 10.

Here, the heat absorber 400 may be separated from the battery pack 10 after having absorbed heat generated in the battery pack 10 in a certain location, such as an electricity charging station, and a new heat absorber 400 may be mounted in the battery pack 10. Accordingly, even when it is difficult to apply the circulation cooling method, heat inside the battery pack 10 may be efficiently dissipated.

Referring to FIGS. 1 and 2, the battery pack 10 includes the battery modules 100, a support 200, the cover 300, and the heat absorber 400.

The battery modules 100 include the battery cells 110. The support 200 supports a side of the battery modules 100. The cover 300 accommodates the battery module 100 and is coupled to the support 200.

The heat absorber 400 is installed between the battery modules 100 and the cover 300 to absorb heat between the battery modules 100 and the cover 300. The heat absorber 400 may be formed of a material that is capable of easily absorbing heat and increasing a heat capacity of the battery pack 10.

The heat absorber 400 may be separably or removably installed. In this As such, the heat absorber 400 may absorb heat from the battery pack 10. After absorbing heat, the heat absorber 400 may be separated from the battery pack 10.

The heat absorber 400 is separated from the battery pack 10 after having absorbed heat and is moved away from the battery pack 10, and a new heat absorber 400 is mounted on the battery pack 10 to absorb heat from the battery pack 10. After discharging heat while away from the battery pack 10, the separated heat absorber 400 may be mounted on the battery pack 10 again.

Heat is primarily generated in the battery cells 110 of the battery module 100, and the heat absorber 400 may absorb the generated heat. The heat absorber 400 may be installed on the battery modules 100 or on an inner surface of the cover 300.

Figure 3:
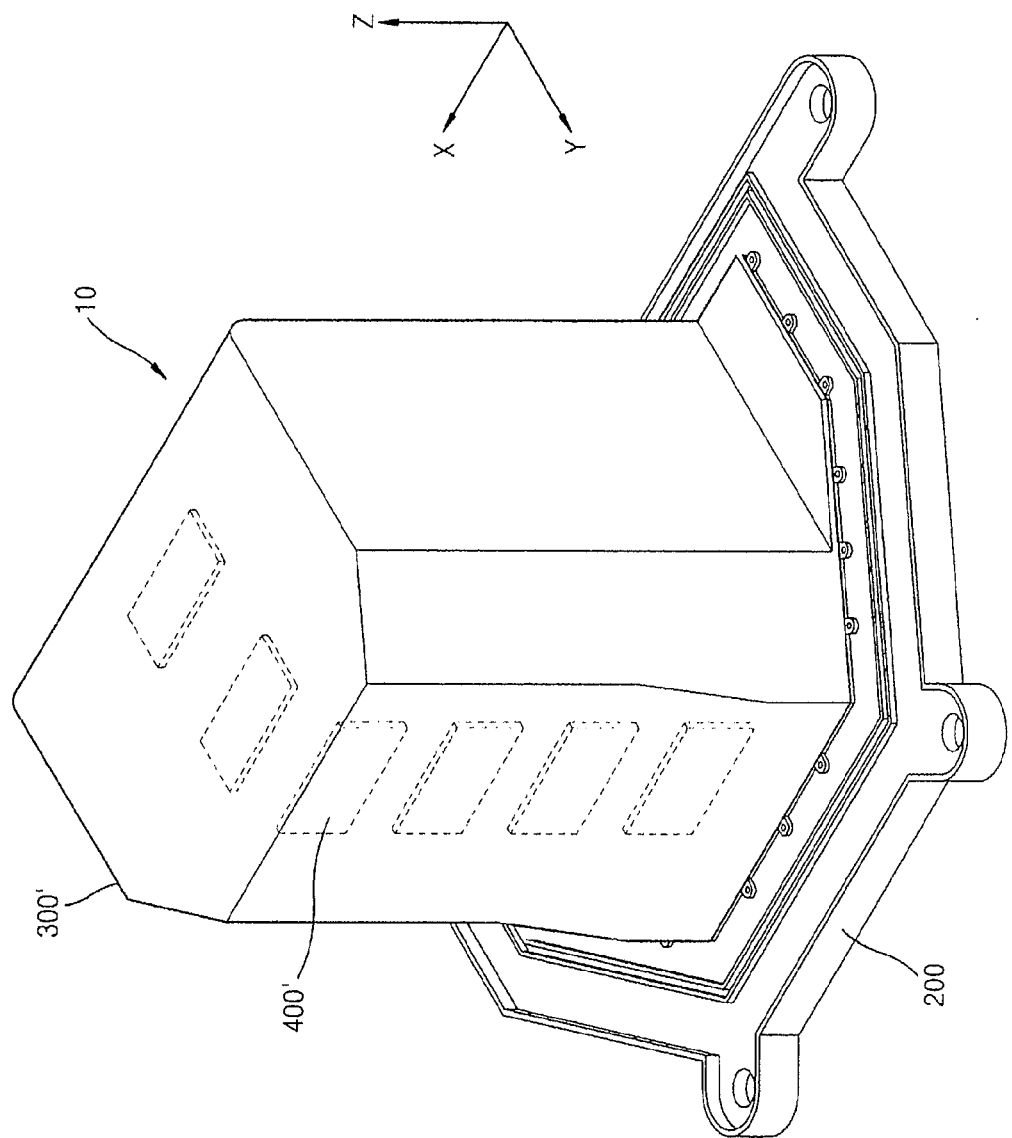
FIG. 3 is a schematic view illustrating a battery pack in which a heat absorber is mounted on an inner surface of a cover, according to an embodiment of the present invention.
Figure 4:
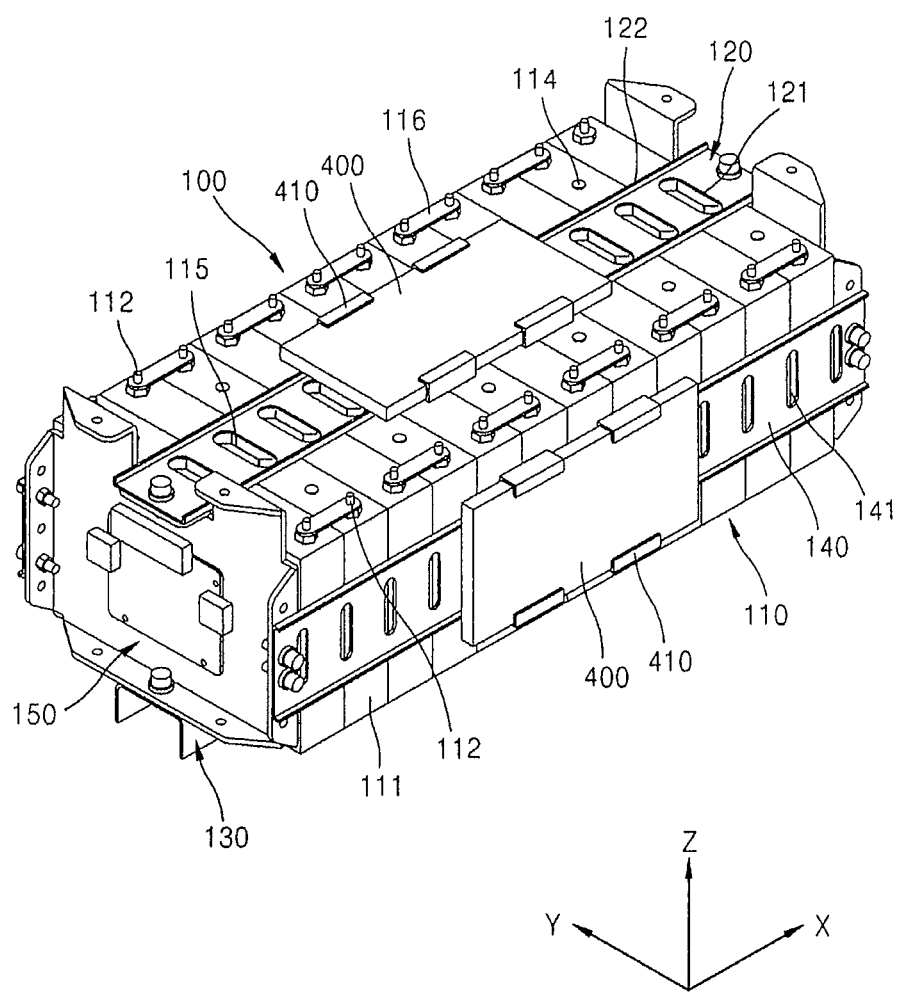
FIG. 4 is a schematic view illustrating a heat absorber mounted on a battery module of the battery pack of FIG. 1.

As illustrated in FIG. 4, the heat absorber 400 may be installed on the battery modules 100 to contact the battery modules 100. According to another embodiment of the present invention, a heat absorber 400' may be installed on an inner surface of a cover 300' to contact the cover 300' as illustrated in FIG. 3.

The support 200 may support a lower side of the battery modules 100. That is, the battery modules 100 may be stacked on the support 200 in a vertical direction and/or in a horizontal direction. A thermal management system (TMS) may be installed in the support 200 to discharge heat from the battery modules 100. However, when the heat absorber 400 is mounted according to the current embodiment of the present invention, a TMS may be omitted.

The cover 300 may be coupled to the support 200 and may accommodate the battery modules 100. Accordingly, the cover 300 may protect the battery modules 100 from external elements. However, the battery pack 10 may alternatively be installed inside a car and the cover 300 may be omitted.

Figure 5:
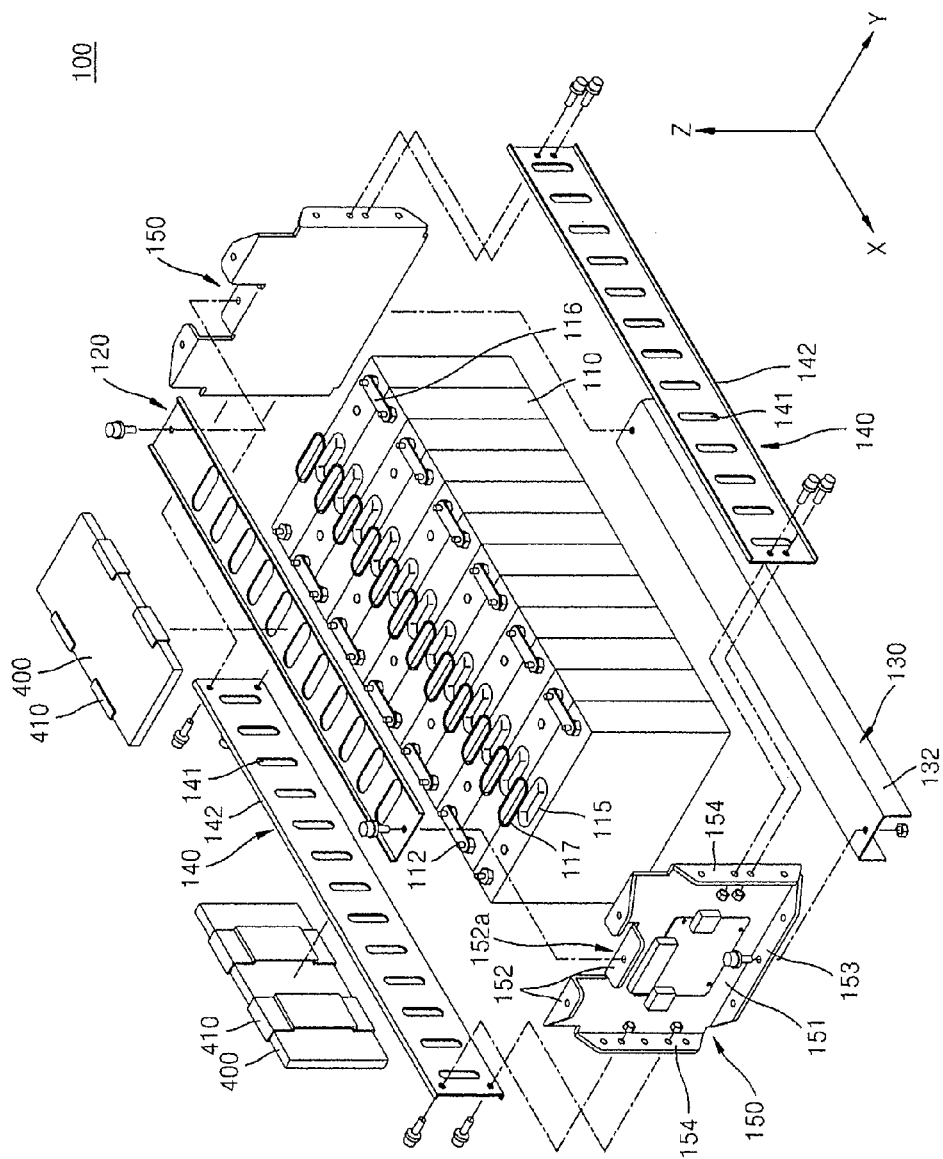
FIG. 5 is an exploded perspective view illustrating elements of the battery module of FIG. 4.
Figure 6:
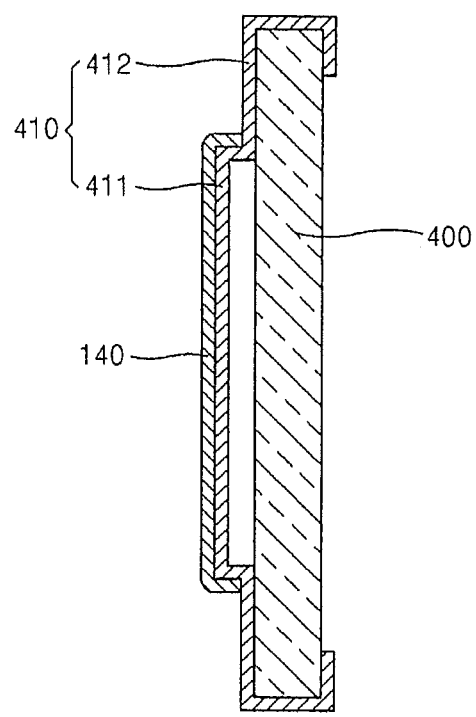
FIG. 6 is a cross-sectional view illustrating a side frame of the battery module of FIG. 4 on which the heat absorber of FIG. 4 is mounted.

FIG. 4 is a schematic view illustrating the heat absorber 400 mounted on one battery module 100 of the battery pack 10 of FIG. 1. FIG. 5 is an exploded perspective view illustrating elements of the battery module 100 of FIG. 4. FIG. 6 is a cross-sectional view illustrating a side frame 140 of the battery module 100 on which the heat absorber 400 of FIG. 4 is mounted.

Referring to FIGS. 4 through 6, the battery module 100 includes at least one of the battery cells 110, for example, a plurality of the battery cells 110 that are stacked on one another. The battery module 100 may include a plurality of the battery cells 110, an upper frame 120, a lower frame 130, the side frame 140, and a pair of end plates 150.

The battery cells 110 may be stacked in a first direction, for example, in an X direction. The upper frame 120 may support a side of the stacked battery cells 110, for example, from above. The lower frame 130 may support another side of the battery cells 110, for example, from below. The side frame 140 may support a lateral side of the stacked battery cells 110. The end plate 150 may support the stacked battery cells 110 at two end portions of the battery module 100.

The plurality of battery cells 110 may be stacked in the first direction to form the battery module 100. The upper frame 120 may be located on the battery cells 110 to support the stacked battery cells 110 from above. The lower frame 130 may be located below the battery cells 110 to support the stacked battery cells 110 from below in a second direction.

The side frame 140 may be located on a side of the battery cells 110 to support the battery cells 110 from the side. The pair of end plates 150 are located at the two end portions of the battery cells 110 to support the battery cells 110.

In FIGS. 4 through 6, the first direction may be the X direction, and the second direction may be a Z direction. When the battery pack 10 is oriented horizontally, the X direction may be a horizontal direction, and the Z direction may be a vertical direction. However, the directions and orientations according to the current embodiment of the present invention are not limited thereto, and may be determined according to the arrangement of the battery pack 10.

The heat absorber 400 may be installed on at least one of the upper frame 120, the lower frame 130, and the side frame 140. As illustrated in FIGS. 4 and 5, the heat absorber 400 may be installed on each of the upper frame 120, the lower frame 130, and the side frame 140.

The battery cells 110 may be stacked in a horizontal direction so as to form a battery pack, and as illustrated in FIGS. 4 through 6, polygonal battery cells may be used. However, the current embodiment of the present invention is not limited thereto and various battery cells such as a circular battery cells or pouch type battery cells may also be used.

In one embodiment, the battery cells 110 may be conventional rechargeable batteries. That is, the battery cells 110 may each include an electrode assembly and an electrolyte solution. The electrode assembly may include a positive electrode plate, a negative electrode plate, and a separator. The electrolyte solution may include lithium ions. The positive electrode plate and the negative electrode plate of the electrode assembly may be electrically coupled to a collector to extend from the electrode assembly.

The electrode assembly may be accommodated in a case 111, and an electrode terminal 112 may be exposed from the case 111. The collector electrically coupled to the positive electrode plate and the negative electrode plate may also be electrically coupled to the electrode terminal 112. The case 111 may be cylindrical or quadrilateral. The battery cells 110 each may include a plurality of electrode assemblies inside one case 111.

The plurality of battery cells 110 are stacked in a horizontal direction to form the battery module 100. The battery cells 110 that are stacked adjacent to each other may be electrically coupled to each other via the electrode terminals 112. The electrode terminals 112 of the battery cells 110 may be electrically coupled via a bus bar 116.

The battery cells 110 that are adjacent to one another may be arranged alternately such that a positive electrode of each battery cell 110 is arranged adjacent to a negative electrode of an adjacent battery cell 110. The plurality of battery cells 110 may be connected in a parallel, a serial, or a combination of the two. Accordingly, the plurality of battery cells 110 are connected in a line, thereby forming one battery module 100. The connection configuration and number of the stacked battery cells 110 may be determined with consideration of charging and discharging capacities.

A cap plate may be coupled to an opening portion of the case 111. The cap plate may be formed of a thin plate. An electrolyte solution inlet through which an electrolyte solution is injected may be formed in the cap plate. The electrolyte solution inlet may be sealed by using a sealing stopper 114 after the electrolyte solution is injected.

Also, a vent member 115, including a groove configured to fracture according to a set internal pressure is formed, may be formed in the cap plate. When the upper frame 120 is located on the horizontally stacked plurality of battery cells 110, a discharging opening 121 of the upper frame 120 may be located over the vent member 115.

The battery cells 110 according to the current embodiment of the present invention may be lithium-ion batteries as described above. However, the embodiment of the present invention is not limited thereto, and the battery cells 110 may also be any of various types of batteries, such as nickel-cadmium rechargeable batteries, nickel-hydrogen rechargeable batteries, or lithium batteries.

In each of the battery cells 110 including lithium, the electrode assembly expands or contracts when charging or discharging, respectively. When the electrode assembly expands or contracts, the expansion or contraction thereof may physically influence the case 111. Accordingly, the case 111 is physically expanded or contracted in accordance with changes of the electrode assembly.

Deformation of the case 111 may be permanent after repeated expansion and contraction and the increase in volume of the case 111 may increase resistance and decrease efficiency of the battery cell 110. To prevent decreases in the efficiency due to the volume expansion of the case 111, the end plates 150 may support the battery cells 110 at two ends of the battery cells 110. Accordingly, a pressure may be applied to the stacked battery cells 110.

Also, heat may be generated in the battery cells 110 due to charging or discharging, and the battery performance and lifespan of the battery cells 110 may be degraded due to the generated heat. Accordingly, in the battery pack 10 according to the current embodiment, heat therein may be absorbed by the heat absorber 400, which is exchangeable, and may be discharged away from the battery pack 10.

A pair of the end plates 150 may be arranged in a horizontal and/or vertical direction and at two ends of the plurality of battery cells 110. Also, the upper frame 120, the lower frame 130, and the side frame 140 may be respectively supported at upper, bottom, and lateral surfaces of each of the end plates 150 and be compressively fixed from extending in a horizontal direction due to expansion and contraction of the plurality of battery cells 110.

The end plates 150 may be located at two ends of the battery module 100. One surface of each of the end plates 150 is closely adhered to an external surface of one of the battery cells 110 that are located on either outermost ends of the battery module 100 to thereby support the stacked battery cells 110.

The end plates 150 may include a base plate 151 and flange portions 152, 153, and 154. The base plate 151 has a size capable of covering an external surface of one battery cell 110. According to the current embodiment, the base plate 151 is approximately a square, but is not limited thereto. The flange portions 152, 153, and 154 may be bent away from the base plate 151.

The flange portions 152, 153, and 154 may be an upper surface flange portion 152, a lower surface flange portion 153, and a lateral surface flange portion 154. The upper surface flange portion 152 is coupled to the upper frame 120. The lower surface flange portion 153 is coupled to the lower frame 130. The lateral surface flange portions 154 are coupled to the side frame 154.

A plurality of battery modules 100 may be stacked together in a vertical direction and/or in a horizontal direction to form the battery pack 10. The battery modules 100 that are stacked adjacent to each other may be supported by one another as the end plates 150 are coupled to one another.

As such, the upper surface flange portion 152 of one battery module 100 may be coupled to the lower surface flange portion 153 of a battery module 100 that is stacked thereabove. The lower surface flange portion 153 may be coupled to the upper surface flange portion 152 of a battery module 100 that is stacked therebelow. The lateral surface flange portion 154 may be coupled to another lateral surface flange portion 154 of an adjacent battery module 100.

The upper surface flange portion 152, the lower surface flange portion 153, and the lateral surface flange portion 154 may be respectively coupled to the upper frame 120, the lower frame 130, and the side frame 140 with bolts and nuts. However, the embodiments of the present invention are not limited thereto, and the coupling may be conducted by using any of various methods, such as welding.

The upper frame 120 is located on the plurality of battery cells 110 stacked in a horizontal direction, and may be coupled to the upper surface flange portion 152 on the upper surface of the end plates 150. In the upper frame 120, the discharging opening 121 is formed at a position corresponding to the vent member 115 of the battery cells 110.

The upper frame 120 may have upper frame bent portions 122 that are bent at two sides in a length direction. A sealing member is mounted inside the upper frame bent portions 122. The sealing member may be formed of an elastic material, such as rubber. The upper frame 120 may form a sealed gas discharge path as the lower frame 130 of one battery module 100 stacked therebelow and the sealing members thereof are coupled to each other.

To reduce the likelihood that gas exiting through the vent member 115 will affect the battery cells 110, and to ensure that the gas is discharged through the discharging opening 121 of the upper frame 120, a sealing ring 117 may be included between the upper frame 120 and the vent member 115.

The sealing ring 117 may be, for example, an O-ring. A groove 152a is formed in an upper center portion of the end plates 150 so that the upper frame 120 may be safely mounted thereon. Thus, the discharging opening 121 of the upper frame 120 may be closely adhered to the battery cells 110.

Also, the sealing ring 117 between the battery cells 110 and the upper frame 120 may be formed to have a sufficient thickness. Accordingly, when the upper frame 120 is coupled to the end plates 150, the upper frame 120 applies pressure on the upper portion of the battery cell 110 to compress the sealing ring 117 located between the upper frame 120 and the end plates 150.

The lower frame 130 is located below the battery cells 110 to support load of the plurality of battery cells 110, and is connected to the lower surface flange portion 153 of the end plates 150. In order to withstand the load of the battery cells 110, the lower frame 130 may include lower frame bent portions 130 that are bent away from a surface that supports the battery cells 110.

The lower frame 130 may have a structure that opens toward away from the battery cells 110. Also, the lower frame bent portion 132 may be coupled to the upper frame 120 of one battery module 100 stacked thereabove to form a gas path. The gas path that is formed as the lower frame 130 and the upper frame 120 of the battery modules 100 that are stacked on and under one another may function as a duct that discharges gas when gas is generated.

The lower frame 130 of a first battery module and the upper frame 120 of a second battery module 100 that are stacked together may discharge gas while forming a seal, and may function as a path that induces gas discharges even when the seal is not a complete seal. When gas is generated in the battery cells 110, explosion by abrupt chemical reaction may occur, and thus a tremendous amount of gas may be generated in a short time. Accordingly, when a duct for discharging gas is formed in the battery pack, gas may be easily discharged.

The side frame 140 may be located on a side of the battery cells 110 to support the battery cells 110 from the side. The side frame 140 may extend from end plate 150 to end plate 150.

At least one through hole 141 may be formed in the side frame 140 to reduce a weight of the side frame 140. Also, the side frame 140 may include a lateral side frame bent portion 142 that is bent away from a surface of the side frame 140 supporting the battery cells 110. Bending of the side frame 140 may be substantially prevented due to the side frame bent portion 142.

The heat absorber 400 is installed between the battery module 100 and the cover 300 and absorbs heat generated in the battery module 100. The heat absorber 400 may be detachably installed. Accordingly, the heat absorber 400 may absorb heat generated in the battery module 100 between the battery module 100 and the cover 300, and a new heat absorber 400 may be exchanged after separating the cover 300 from the heat absorber 400.

The heat absorber 400 may be installed to contact the battery module 100 or the cover 300 to efficiently absorb heat generated in the battery module 100. According to an embodiment, the heat absorber 400 may be installed to directly contact the battery module 100.

In this case, a plurality of the heat absorbers 400 may be installed to the upper frame 120, the lower frame 130, and/or the side frame 140, respectively. To this end, the heat absorber 400 is supported by a support portion 410, and the support portion 410 may be attached to the upper frame 120, the lower frame 130, and the side frame 140.

The support portion 410 may include an insertion portion 411 and a holding portion 412. The insertion portion 411 may be inserted into a groove formed in the upper frame 120, the lower frame 130, and/or the side frame 140 and supported by the battery module 100. The holding portion 412 supports the heat absorber 400. The holding portion 412 may be formed as a single unit with the insertion portion 411. Also, a plurality of the support portions 410, for example, two support portions 410, may support one heat absorber 400.

The insertion portion 411 has a protruded shape and may be inserted into the groove formed by the upper frame bent portion 122 and supported by the upper frame 120. Also, the insertion portion 411 may be inserted into a groove formed by the side frame bent portion 142 and may be supported by the side frame 140. A surface or a portion of the holding portion 412 may be opened such that the heat absorber 400 is easily inserted or detached.

In the embodiment illustrated in FIGS. 4 and 5, the heat absorber 400 is installed to the battery module 100. However, the current embodiment of the present invention is not limited thereto, and the heat absorber 400 may be oriented in any of various positions near the battery cells 110 of the battery module 100, which are primary heat generating sources. According to another embodiment of the present invention, the heat absorber 400' may be installed to contact the cover 300' on the inner surface of the cover 300' as illustrated in FIG. 3. To this end, an accommodating portion for accommodating the heat absorber 400' may be formed on the inner surface of the cover 300'.

The heat absorber 400 may be formed of a phase change material (PCM). A PCM refers to a material whose phase changes at a set temperature that may absorb or discharge a large amount of heat without causing a change in temperature of the material.

That is, by including a PCM, the heat absorber 400 may absorb heat generated in the battery module 100 and store the heat. Accordingly, by increasing a heat capacity of the battery pack 10 and absorbing the heat generated in the battery module 100, a temperature increase of the battery cells 110 may be reduced.

However, the embodiments of the present invention are not limited thereto, and the heat absorber 400 may also be formed of other materials that are capable of storing heat besides a PCM. For example, the heat absorber 400 may be a water pack including water or a cooling pack that includes ethanol and glycerin.

The battery pack 10 according to the current embodiment of the present invention has an increased heat capacity due to the heat absorber 400, thereby efficiently discharging heat generated in the battery pack 10 out of the battery pack 10. Also, when a quick drop method is applied to cars such as electric cars, heat in the battery pack 10 may be efficiently absorbed without applying a circulation method. Thus, increase of the temperature in the battery pack 10 may be reduced.

Figure 7:
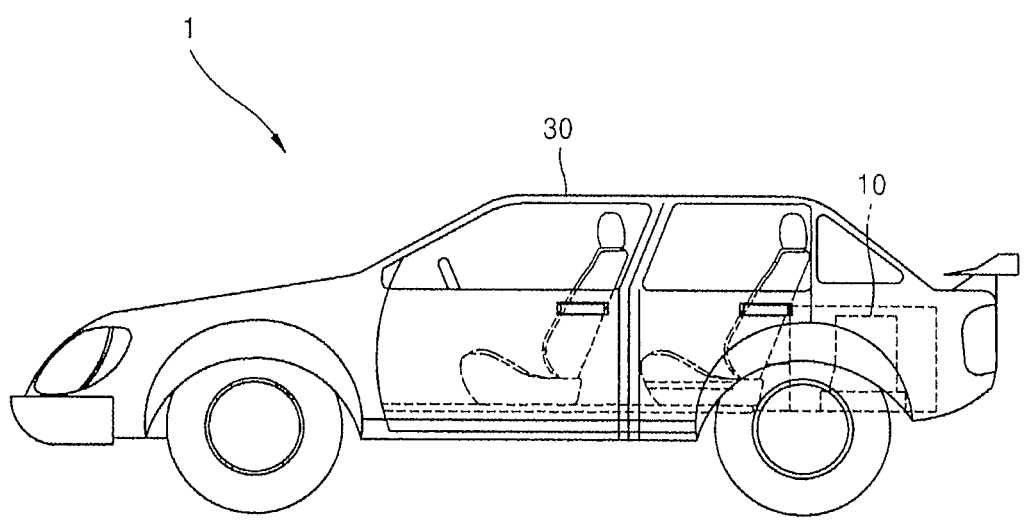
FIG. 7 is a schematic view of an electric car in which the battery pack of FIG. 1 is accommodated.

FIG. 7 is a schematic view of an electric car 1 in which the battery pack 10 of FIG. 1 is accommodated, as an example of the battery pack of FIG. 1.

Referring to FIG. 7, the battery pack 10 may be formed by forming a plurality of the battery module 100 by arranging a plurality of the battery cells 110 in a horizontal direction and stacking the battery modules 100 in two columns of four, that is, combining eight (2×4) battery modules 100 in total.

The battery module 100 may include a duct for discharging gas, which is formed as the lower frames 130 and the upper frames 120 of the battery modules 100 located above and below each other are coupled to each other.

The battery pack 10 may be loaded in a defined space in a car body 500 of the electric car 1. The battery pack 10 may be mounted in the car body 500 by using a quick drop method through which the battery pack 10 may be removed from the electric car 1.

In the battery pack 10 including the battery cells 110, gas may generate explosions or other effects. In this case, a tremendous amount of toxic gas may be generated in a short time. When the toxic gas flows into a space that houses people, the people may be affected by the toxic gas.

The battery pack 10 may be accommodated in a sealing case and sealed therein, and the sealing case may be connected via an external duct. Accordingly, by connecting an external duct to the battery pack 10, exhaust gases can be discharged out of the electric car.

In this case, much heat may be generated in the battery pack 10. However, by absorbing heat using the heat absorber 400 included in the battery pack 10, an abrupt increase in temperature in the battery pack 10 may be prevented.

As described above, according to the one or more of the above embodiments of the present invention, the cooling characteristics of the battery pack may be improved by increasing a heat capacity of the battery pack.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
   at least one battery module comprising:
      a plurality of battery cells;
      a lower frame extending along and directly contacting the battery cells;
      an upper frame extending along and directly contacting the battery cells; and
      a side frame extending along and directly contacting each of the battery cells, wherein the lower frame, the upper frame and the side frame are all spaced from each other;
   a support portion coupled to at least one of the upper frame and the side frame; and
   a heat absorber removably mounted to the support portion.

2. The battery pack of claim 1, wherein the heat absorber comprises a phase change material.

3. The battery pack of claim 1, wherein the heat absorber comprises ethanol and glycerin, or water.

4. The battery pack of claim 1, wherein the battery cells are stacked.

5. The battery pack of claim 1, further comprising a cover that is coupled to the support and accommodates the at least one battery module.

6. A battery pack comprising:
   a plurality of battery modules each comprising:
      a plurality of battery cells;
      a lower frame extending along and directly contacting the battery cells;
      an upper frame extending along and directly contacting the battery cells; and
      a side frame extending along and directly contacting each of the battery cells, wherein the lower frame, the upper frame and the side frame are all spaced from each other;
   a support portion coupled to at least one of the upper frame and the side frame, wherein the support portion comprises an insertion portion coupled to the at least one of the upper frame and the side frame and a holding portion;
   a cover accommodating the battery modules; and
   a heat absorber between one of the battery modules and the cover.

7. The battery pack of claim 6, wherein the heat absorber comprises a phase change material.

8. The battery pack of claim 6, wherein the heat absorber comprises ethanol and glycerin, or water.

9. The battery pack of claim 6, wherein the heat absorber contacts the cover or at least one of the battery modules.

10. The battery pack of claim 6, wherein the heat absorber is mounted on at least one of the upper frame and the side frame.

* * * * *